July 6, 1926.

F. G. YAWMAN

HANDLE FOR TOOLS OR THE LIKE

Filed July 14, 1925

1,591,203

INVENTOR.
Frederick G. Yawman.
BY
his ATTORNEYS.

Patented July 6, 1926.

1,591,203

UNITED STATES PATENT OFFICE.

FREDERICK G. YAWMAN, OF ROCHESTER, NEW YORK.

HANDLE FOR TOOLS OR THE LIKE.

Application filed July 14, 1925. Serial No. 43,506.

The present invention relates to handles for tools or the like and an object of the invention is to provide a simple and effective means for securing a handle to a tool or other implement, while permitting the handle to rotate on said tool.

To this and other ends, the invention consists of certain parts, and combinations of parts, all of which will be hereinafter described: the novel features being pointed out in the appended claims.

In the drawings:—

Figure 1:
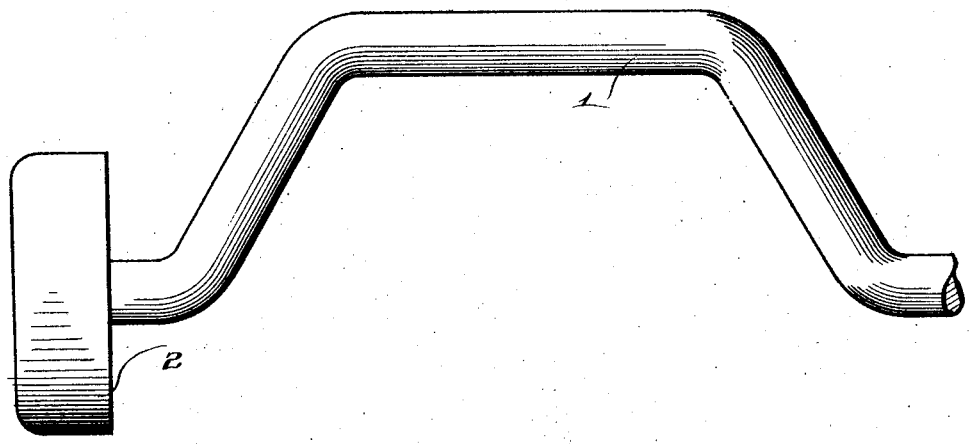
Fig. 1 is a fragmentary side view of a brace to which a handle is secured.
Figure 2:
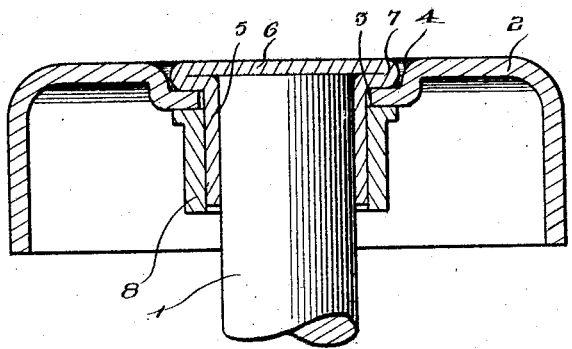
Fig. 2 is a longitudinal section through the handle.

Referring more particularly to the drawing, 1 indicates the brace and 2 the handle. The handle, in this instance, is in the form of a cup shaped member with a central opening 3 and a depressed portion 4 about said opening. The handle is secured to the tool through the medium of a pressed up cap member 5 which has cylindrical inner and outer walls, the cylindrical inner wall fitting the outer cylindrical surface of the tool 1. The cap 5 is pressed outwardly adjacent its top 6 to provide an outwardly presented flange 7 which is adapted to fit in the depressed portion 4 and engage the top surface of the handle 2 within said depression.

About the cap member 5 is fitted a sleeve or bushing 8 which has a cylindrical inner wall fitting the cylindrical outer wall of the cap member. The inner end of said bushing abuts the underside of the handle adjacent the opening 3 so that the handle is held between the end of the sleeve or bushing 8 and the flange 7, the holding being such that the handle may turn with reference to the cap member 5 and the bushing 8, while the latter two parts are held against turning relatively to the tool 1.

What I claim as my invention and desire to secure by Letters Patent is:—

1. The combination with a tool, of a cap member fitted upon the end of the tool and having an outwardly extending flange at such end, a sleeve fitted to the cap member and having an end spaced from the flange, and a cup shaped handle member having a central opening through which the cap member extends, the portions of the handle adjacent said opening lying between the outwardly extending flange on the cap member and the adjacent end of the sleeve and being mounted to turn on such cap member.

2. The combination with a tool, of a cap member fitted upon said tool and having an outwardly extending flange at its top, a sleeve fitted on the cap member and having its inner end spaced from the flange, and a handle having a central opening through which the cap member extends, said handle having a depressed portion about the central opening in which the flange of the cap member lies.

FREDERICK G. YAWMAN.